United States Patent
Bartolucci et al.

(10) Patent No.: US 11,979,385 B2
(45) Date of Patent: May 7, 2024

(54) SECURITY-ENHANCED ORIGINATION OF BLOCKCHAIN TRANSACTIONS

(71) Applicant: nChain Licensing AG, Zug (CH)

(72) Inventors: Silvia Bartolucci, London (GB); Pauline Bernat, London (GB); Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/707,866

(22) Filed: Mar. 29, 2022

(65) Prior Publication Data

US 2022/0294769 A1    Sep. 15, 2022

Related U.S. Application Data

(63) Continuation of application No. 16/954,175, filed as application No. PCT/IB2018/059922 on Dec. 12, 2018, now Pat. No. 11,297,041.

(30) Foreign Application Priority Data

Dec. 15, 2017    (GB) .................................. 1721021

(51) Int. Cl.
*H04L 29/06*    (2006.01)
*H04L 9/08*    (2006.01)
(Continued)

(52) U.S. Cl.
CPC ........ *H04L 63/0421* (2013.01); *H04L 9/0841* (2013.01); *H04L 9/085* (2013.01);
(Continued)

(58) Field of Classification Search
None
See application file for complete search history.

(56) References Cited

U.S. PATENT DOCUMENTS

| 8,316,237 B1 | 11/2012 | Felsher et al. |
| 8,340,287 B2 * | 12/2012 | Sandhu ................. H04L 9/0825 380/44 |

(Continued)

FOREIGN PATENT DOCUMENTS

| CN | 107528835 A | 12/2017 |
| WO | 2018059939 A1 | 4/2018 |

OTHER PUBLICATIONS

Aitzhan et al., "Security and Privacy in Decentralized Energy Trading through Multi-signatures, Blockchain and Anonymous Messaging Streams," IEEE Transactions on Dependable and Secure Computing 15(5):840-52, Jan. 1, 2016.
(Continued)

*Primary Examiner* — Maung T Lwin
(74) *Attorney, Agent, or Firm* — Davis Wright Tremaine LLP (57) ABSTRACT

A blockchain-implemented transaction from an originator node is to be broadcast. The originator node is communicatively coupled to proxy nodes. The method, implemented by a proxy node, includes: receiving a transaction including an input taking x+r units of computing resources, an output providing x units to the output address and another output providing d+r units to a 1-of-n multi-signature address unlockable by any one of a set of private keys associated the proxy nodes. The proxy node selects a quantity of computing resources, t units, to be allocated to the proxy node for broadcasting the transaction and having it included in the blockchain and generates a further transaction taking d+r units sourced from the multi-signature address and an output providing t units to the proxy node. The proxy node broadcasts both transactions timed to permit their inclusion in the same block of the blockchain.

12 Claims, 7 Drawing Sheets (51) Int. Cl.
*H04L 9/30* (2006.01)
*H04L 9/32* (2006.01)
*H04L 9/40* (2022.01)
*H04L 9/00* (2022.01)

(52) U.S. Cl.
CPC .......... *H04L 9/0861* (2013.01); *H04L 9/3073* (2013.01); *H04L 9/3247* (2013.01); *H04L 63/0281* (2013.01); *H04L 9/3236* (2013.01); *H04L 9/50* (2022.05)

(56) References Cited

U.S. PATENT DOCUMENTS

| | | | |
|---|---|---|---|
| 9,774,578 | B1 | 9/2017 | Ateniese et al. |
| 2006/0123465 | A1* | 6/2006 | Ziegler .............. H04L 63/0861 726/2 |
| 2015/0358300 | A1 | 12/2015 | Urzi et al. |
| 2016/0300231 | A1 | 10/2016 | Shavell et al. |
| 2017/0091397 | A1* | 3/2017 | Shah ........................ H04L 63/20 |
| 2017/0206523 | A1 | 7/2017 | Goeringer et al. |
| 2017/0243193 | A1* | 8/2017 | Manian .............. G06Q 20/3829 |
| 2017/0324738 | A1 | 11/2017 | Hari et al. |
| 2017/0337534 | A1 | 11/2017 | Goeringer et al. |
| 2017/0345011 | A1 | 11/2017 | Salami et al. |
| 2018/0137512 | A1 | 5/2018 | Georgiadis et al. |
| 2018/0254891 | A1* | 9/2018 | Linder ................ G06Q 20/3823 |
| 2020/0021446 | A1* | 1/2020 | Roennow .............. H04L 9/0819 |

OTHER PUBLICATIONS

Antonopoulos, "Mastering Bitcoin—Unlocking Digital Cryptocurrencies," O'Reilly Media, Inc., Dec. 20, 2014, 282 pages.
Barrymac et al., "What would be the process for identifying a person that performed a transaction from a wallet on a personal device?," Bitcoin StackExchange, Nov. 15, 2011, https://bitcoin.stackexchange.com/questions/2000/what-would-be-the-process-for-identifying-a-person-that-performed-a-transaction, 3 pages.
Biryukov et al., "Deanonymisation of clients in Bitcoin P2P network," Proceedings of the 2014 ACM SIGSAC Conference on Computer and Communications Security, Nov. 3, 2014, 15 pages.
Davis et al., "Thinking about ways to make it more difficult to link IP address to txn creator," Bitcoin Forum, Mar. 14, 2015, https://bitcointalk.org/index.php?topic=990275.0;all, 15 pages.
Dingledine et al., "Tor: The second-generation onion router," Naval Research Lab, Washington DC, Jan. 1, 2004, 18 pages.
Goblin et al., "Configurable transaction fees," Bitcoin Forum, May 4, 2011, https://bitcointalk.org/index.php?topic=7240.0, 7 pages.
International Search Report and Written Opinion dated Dec. 12, 2018, Patent Application No. PCT/IB2018/059922, 13 pages.
Nakamoto, "Bitcoin: A Peer-to-Peer Electronic Cash System," Bitcoin, Oct. 31, 2008, https://bitcoin.org/bitcoin.pdf, 9 pages.
Nmat et al., "Microsoft Researchers Suggest Method to Improve Bitcoin Transaction Propagation," Bitcoin Forum, Nov. 13, 2011, 37 pages.
Ponury Typ et al., "Re: [ANN] Navajo [NAV]—The Unbreakable Code [PoS/Anonymity/Privacy] p. 116," Bitcoin Forum, Jul. 30, 2014, https://bitcointalk.org/index.php?topic=679791.2300, 6 pages.
UK Commercial Search Report dated May 4, 2018, Patent Application No. GB1721021.2, 7 pages.
UK IPO Search Report dated Jun. 11, 2018, Patent Application No. GB1721021.2, 8 pages.
Van Saberhagen, "CryptoNote v 2.0," Oct. 17, 2013, https://bytecoin.org/old/whitepaper.pdf, 20 pages.
Venkatakrishnan et al., "Dandelion: Redesigning the Bitcoin Network for Anonymity," Proceedings of the ACM on Measurement and Analysis of Computing Systems 1(1):1-34, Jun. 13, 2017.
Satoshi et al., "Connection Limits," Bitcoin Forum, Aug. 9, 2010, https://bitcointalk.org/index.php?topic=741.0; prev_next=prev, 2 pages.
International Search Report and Written Opinion dated Mar. 21, 2019, Patent Application No. PCT/IB2018/059922, 13 pages.

* cited by examiner

SECURITY-ENHANCED ORIGINATION OF BLOCKCHAIN TRANSACTIONS

CROSS REFERENCE TO RELATED APPLICATIONS

This application is a continuation of U.S. patent application Ser. No. 16/954,175, filed Jun. 15, 2020, entitled "SECURITY-ENHANCED ORIGINATION OF BLOCKCHAIN TRANSACTIONS," which is a 371 Nationalization of International Patent Application No. PCT/IB2018/059922, filed Dec. 12, 2018, entitled "SECURITY-ENHANCED ORIGINATION OF BLOCKCHAIN TRANSACTIONS," which claims priority to United Kingdom Patent Application No. 1721021.2, filed Dec. 15, 2017, the disclosures of which are herein incorporated by reference in their entirety.

The present application relates generally to network communications and cryptography. More particularly, it relates to the communication of blockchain transactions to a blockchain network and to the use of cryptographic techniques in order to obscure the origin of those communications. Obscuring the identity of an originator node associated with introduction of a transaction in a blockchain network may enhance privacy and security.

In this document the term 'blockchain' is used to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the subject matter of the present application is not limited to use with the Bitcoin blockchain and alternative blockchain implementations and protocols fall within the scope of the present application. The term "Bitcoin" as used herein includes all versions of Bitcoin and all variations deriving from the Bitcoin protocol.

A blockchain is a peer-to-peer, electronic ledger which is implemented as a computer-based decentralised system made up of blocks which in turn are made up of transactions. Each transaction is a data structure that encodes the transfer of control of a digital asset between addresses in the blockchain system, and includes at least one input and at least one output. Each block contains a hash of the previous block to that blocks become chained together to create a permanent, unalterable record of all transactions which have been written to the blockchain since its inception.

Blockchains can be employed in a wide variety of applications. For example, a blockchain may be employed in providing a ledger reflecting ownership of one or more commodities. For example, in the Bitcoin blockchain the ledger reflects ownership of Bitcoins and fractions thereof. Some such commodities may represent an underlying unit such as for example, units of computing resources. A blockchain-based ledger reflecting ownership may allow commodities to be transferred between parties pseudo-anonymously, with the transactions on the blockchain not including personally-identifying information of either party.

In particular, the outputs of a given transaction may be sent to addresses, the addresses corresponding to public keys of particular parties. Those outputs may then be used by associated parties as inputs to further transactions, unlocked by the counterpart private key of the public key corresponding to the address.

The permanent or immutable nature of a blockchain means that the addresses involved in a given transaction are permanently, publicly available.

In order to introduce a transaction to the various nodes or computer systems participating in the decentralized system, it is necessary to distribute that transaction. This distribution may, for example, employ a protocol whereby an overlay network is formed with connections between various of the nodes participating in the decentralized system and a gossip protocol may be employed whereby nodes distribute a given transaction to adjacent nodes in the overlay network.

In any event, regardless of how a transaction is eventually propagated in the network, it is necessary to introduce or inject the transaction into the decentralized system for distribution. This introduction necessarily requires network communication and may, therefore, have the side effect of revealing information about the originator of a transaction at the network level such as, for example, an Internet Protocol (IP) address. If another party is able to correlate such information with a particular address employed on the blockchain, then it may be usable to comprise the identity of a party or to track all transactions associated with that party even if multiple public addresses are employed.

Thus, it is desirable to provide a solution which allows a transaction for inclusion on a blockchain while obscuring the network origin of the transaction.

Such an improved solution has now been devised.

The present application provides method(s) and system(s) as defined in the appended claims.

The present application describes a computer-implemented method. This may be implemented by a given proxy node. The method may include receiving, via a computer network, a transaction generated and partially signed by an originator node, the transaction including a first input and a first and second output, wherein the first input takes $x+r$ units of computing resources and wherein the first output provides x units to an output address and the second output provides $d+r$ units to a 1-of-n multi-signature address unlockable using any one of a plurality of second private keys, each of the second private keys being associated with a respective one of a plurality of proxy nodes, the plurality of proxy nodes including the given proxy node, and each of the second private keys derivable by the respective one of the plurality of proxy nodes based on a private key of an asymmetric encryption key pair of that proxy node and a secret value that proxy node shares with the originator node; selecting a quantity of computing resources, t units, to be allocated to the given proxy node for broadcasting the transaction and having the transaction included in the blockchain and selecting a quantity of computing resources, f units, to be allocated to a third-party for including the transaction in the blockchain, wherein $f<r$ and $t<(r-f)$; digitally signing an updated transaction generated by adding a second input taking $d+f$ units to the transaction; generating and digitally signing a further transaction including an input taking $d+r$ units sourced from the 1-of-n multi-signature address using the second private key of the proxy node and an output providing t units to the given proxy node; and broadcasting the updated transaction and the further transaction, timed to permit their inclusion in the same block of the blockchain.

In some implementations, receiving the transaction may include receiving an identifier of the transaction.

In some implementations, the broadcast of the updated transaction and the broadcast of the further transaction may be substantially concurrent.

In some implementations, the received identifier of the transaction may be encrypted using a public key of the given proxy node.

In some implementations, the quantity f of computing resources to be allocated to the third-party for including the transaction in the blockchain may be selected based on an indication received via the computer network. The indication may be received from the originator node.

In some implementations, the quantity of computing resources, f to be allocated to the third-party for including the transaction in the blockchain may be selected based on having the transaction included in a next block in the blockchain.

In some implementation, at least one of the quantity of computing resources, f to be allocated to the third-party for including the transaction in the blockchain and the quantity of computing resources, t units, to be allocated to the given proxy node for broadcasting the transaction may be further selected based on having the further transaction included in a next block in the blockchain.

In some implementations, the originator node may have an associated asymmetric encryption key pair including a public key and a private key and the secret value shared between the originator node and the given proxy node may be derivable by the originator node based on its private key and the public key of the given proxy node and by the given proxy node based its private key and the public key of the originator node.

In some implementations, the asymmetric encryption key pairs may be elliptical-curve key pairs. It may be that the secret value shared between the originator node and a particular proxy node corresponds to an Elliptical-Curve Diffie-Hellman (ECDH) key exchange.

The present application further describes a computing device including a processor; a memory; a network interface; and a non-transitory computer-readable storage medium storing computer-executable instructions that, when executed by the processor, cause the computing device to carry out a method as described above.

The present application further describes a non-transitory computer-readable storage medium storing computer-executable instructions that, when executed by a processor of a computing device, cause the computing device to carry out a method as described above.

The present application further describes a computer-implemented method implemented by an originator node. The method may include determining a second public key for each of a plurality of proxy nodes based on a first public key associated with that proxy node and a secret value shared between the originator node and that proxy node, wherein a corresponding second private key for each of the proxy nodes is determinable by a given proxy node based on the secret value shared between the originator node and the given proxy node and on a first private key associated with the given proxy node and corresponding to the first public key associated with the given proxy node; generating, by the originator node, a transaction including an input and a first and a second output, wherein the input takes x+r units and wherein the first output provides x units to an output address and the second output provides d+r units to a 1-of-n multi-signature address unlockable using any one of the second private keys; digitally signing the transaction; and distributing the signed transaction to the proxy nodes via a network.

In some implementations, distributing the signed transaction may include sending an identifier of the transaction.

In some implementations, distributing the identifier of the signed transaction to the proxy nodes may include sending a respective indication of the identifier of the signed transaction to each of the proxy nodes. The respective indication sent to a given one of the proxy nodes may be encrypted using a public key of that proxy node.

In some implementations, the originator node may have an associated asymmetric encryption key pair comprising a public key and a private key and the secret value shared between the originator node and a given proxy node may be derivable by the originator node based on its private key and the public key of the given proxy node and by the given proxy node based its private key and the public key of the originator node.

In some implementations, the asymmetric encryption key pairs may be elliptical-curve key pairs. It may be that establishing the secret value shared between the originator node and a particular proxy node corresponds to an Elliptical-Curve Diffie-Hellman (ECDH) key exchange.

The present application further describes a computing device including a processor; a memory; a network interface; and a non-transitory computer-readable storage medium storing computer-executable instructions that, when executed by the processor, cause the computing device to carry out a method as described above.

The present application further describes a non-transitory computer-readable storage medium storing computer-executable instructions that, when executed by a processor of a computing device, cause the computing device to carry out a method as described above.

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompany drawings, in which:

Like reference numerals are used in the drawings to denote like elements and features.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Overview

Many blockchain-based systems are often thought of as anonymous. For example, various ledger systems, such as, for example, Bitcoin are often thought of as anonymous because they may allow parties to send and receive units of one or more commodities without those parties having disclose personal or identifying information. Such systems, may however, be considered more pseudo-anonymous than anonymous, being as the identity of a party may only be protected so long as the addresses used by a party on the blockchain are not associated with the actual identity of the party.

In a specific example, it may be that the IP address or addresses associated with a particular party can be used to compromise that party's anonymity. For example, a malicious adversary may try to link a public key to an IP address so as to allow tracking blockchain transactions involving a particular party. Additionally or alternatively, IP address information might be used in an effort to retrieve a party's actual identity by using it as an index to retrieve information from other sources such as, for example, from internet forums and social media. In such circumstances, attempted mitigations such as, for example, generating multiple public-private key pairs for different sets of blockchain transactions or participating in mixing services as expedients to increase the anonymity of the operations may be unsuccessful—see, for example, "Dandelion: Redesigning the Bitcoin Network for Anonymity" by S. B. Venkatakrishnan, G. Fanti, and P. Viswanath (2017), arXiv preprint arXiv:1701.04439, the contents of which are herein incorporated by reference in their entirety.

As described above, in some blockchain applications, transactions may be propagated by way of an overlay network. The nodes in such an overlay network participating in the monitoring and diffusion of blockchain transactions may be referred to as "super nodes". De-anonymization attacks may be carried out using such a "super node". For example, in the specific example of the Bitcoin blockchain network, the symmetric diffusion over the network may allow for a 30% success rate in linking a particular IP to a particular public key using techniques exploiting the graph structure of the peer-to-peer (P2P) overlay network and certain information related to the diffusion of blockchain transactions on that network—see "Deanonymisation of clients in Bitcoin P2P network" by A. Biryukov, D. Khovratovich and I. Pustogarov (November 2014) in Proceedings of the 2014 ACM SIGSAC Conference on Computer and Communications Security (pp. 15-29), the contents of which are herein incorporated by reference in their entirety.

Beyond the sphere of blockchain applications, attempts have been made to allow obscuring of the IP address associated with particular communications. As an example, anonymous relay tools such as Tor offer one of the strongest identity protection currently available, but still exhibit weaknesses and possible downsides. A description of Tor may be found, for example, in "Tor: The second-generation onion router" by R. Dingledine, N. Mathewson, and P. Syverson (2004) from Naval Research Lab Washington, D.C. Relay systems such as Tor may be vulnerable to traffic analysis such as, for example, where a user's "first-hop" link to Tor and the "last-hop" link from Tor to the user's communication partner may be traced and used to correlate packets. It may be that such attacks can put users' anonymity at risk.

In view of the foregoing, there is a need to protect or obscure the identity of users in blockchain networks at the level of the underlying network such as, for example, at the level of the TCP/IP protocol.

Figure 1:
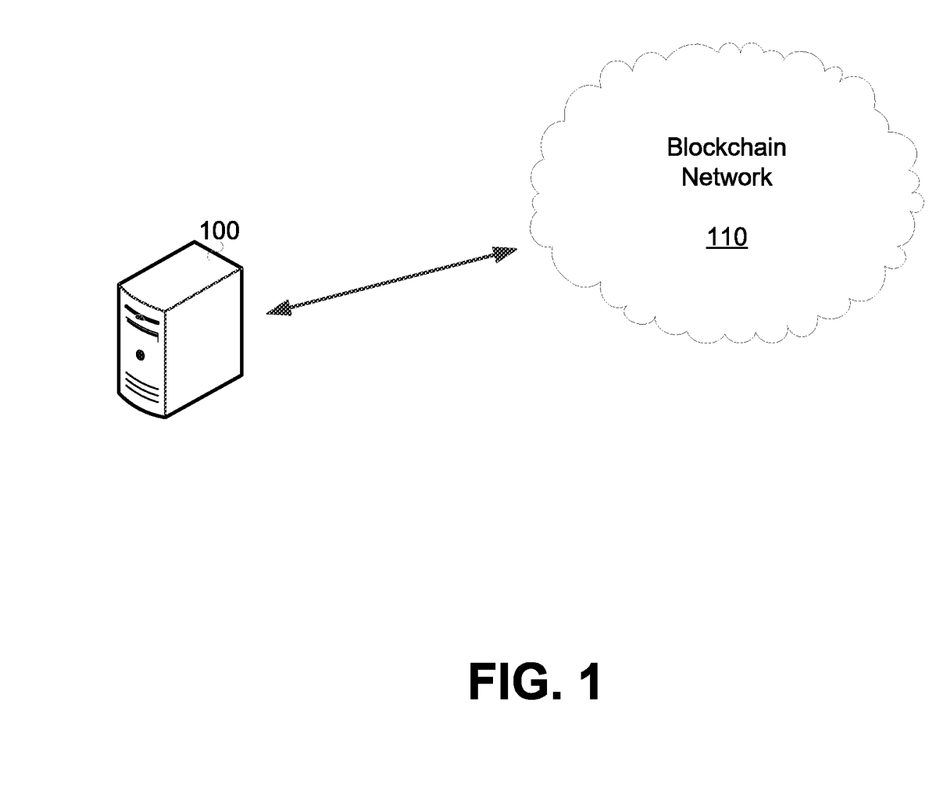
FIG. 1 illustrates an originator node in communication with a blockchain network.

FIG. 1 illustrates an originator node 100 in communication with a blockchain network 110.

The originator node 100 is a computing device.

The blockchain network 110 is an overlay network composed of communicating computing devices (not shown). For example, the blockchain network 110 may be formed of computing devices communicating in a peer-to-peer (P2P) fashion.

In one example, the originator node 100 may, for example, be a Bitcoin node and the blockchain network 110 may, for example, be the Bitcoin network. In a particular example, the originator node 100 may, for example, be a Bitcoin node in communication with a super node (not shown), the super node being one of the computer systems forming the blockchain network 110.

Because the originator node 100 is communicating directly with the blockchain network 110, potentially identifying network information such as, for example, the IP address of the originator node 100 is exposed to the Blockchain network 110. It may be desirable to avoid exposing all or some of such potentially identifying network information.

In one solution, another computer system, acting as a proxy node, may be employed to introduce a transaction into the blockchain network 110 on behalf of the originator node 100 so as to obscure network identifying information such as, for example, the IP address of the originator node 100. Employing a proxy node, however, presents a number of technical challenges.

For example, it may be that the proxy node goes offline making it unavailable, including, potentially, before initiating or completing the broadcast of a blockchain transaction.

In another example, it may be that the proxy node becomes busy or overloaded. A busy or overloaded transaction node may introduce unacceptable latency and/or may be forced to discard blockchain transactions queued for processing due to a lack of resources to maintain a large queue.

One or more of these challenges may be overcome by employing a group of proxy nodes.

In this way, redundancy may be provided. Employing more than one proxy node may make the system more resilient to failure as compared to employing a single node. Thus, resilience and security is enhanced. Additionally, use of more than one proxy node may serve to distribute load. Further, employing more than one proxy node may serve to further obscure the origins of a blockchain transaction as it may avoid having a single proxy node acting as an agent for an originator node on an ongoing basis.

Providing such an arrangement with multiple proxy nodes, however, may present a number of technical challenges.

First, the blockchain transaction may correspond to a transfer of value between addresses. For example, it may be that the blockchain transaction corresponds to a transfer of units of computing resources from one or more source addresses to one or more destination addresses. The one or more source addresses may be associated with a party corresponding to the originator node 100. In a particular example, the blockchain transaction may be a Bitcoin transaction.

When a proxy is employed to introduce a blockchain transaction into a network on behalf of an originator node, it may be that some amount of a blockchain-based resource—e.g., tokens—is provided to the proxy node for successfully communicating a transaction for inclusion in the blockchain. Selecting such an amount may result in undesirable messaging overhead, especially if an originator node is communicating with one or more proxy nodes such as, for example, to determine which one of the proxy nodes will accept the lowest amount. As such, it is a problem to avoid or limit messaging overhead associated with establishing the amount to be provided in association with a particular blockchain transaction.

It is also a problem in employing multiple proxy nodes that, if different proxy nodes are requesting different amounts be provided to each particular proxy node for successfully communicating a transaction for inclusion in the blockchain, it may be that multiple blockchain transactions may have to be generated by an originator node, each transferring the different amounts to an address associated with a particular one of the proxy nodes. Moreover, even if one the proxy nodes requests the same amount as another of the proxy nodes, it may be that multiple blockchain transactions must be generated, each providing the amount to the address associated with a particular one of the proxy nodes.

In some blockchain-based systems such as, for example, Bitcoin, once a transaction has been broadcast, that blockchain transaction must still be included in the blockchain by particular computer systems, known as miners, that are responsible for generating new blocks in the blockchain. Miners receive an amount, in the form of newly minted bitcoins, for performing the computing work necessary to "mine" blocks. Notably, this means that bitcoins correspond directly to such computing resources.

A miner may be provided a mining fee to include a particular blockchain transaction in a mining block. This mining fee is reflected as the surplus of the inputs of a given transaction over the outputs of that blockchain transaction. The minimum fee necessary to include a blockchain transaction in the next block may vary over time.

Another problem in providing a blockchain transaction to multiple proxies for possible broadcast on a blockchain is that the mining fee required for making it likely that a particular blockchain transaction will be included in the next block mined may fluctuate in the period between the generation of a blockchain transaction by an originator node and the transmission of the blockchain transaction by one or more of the proxy nodes to the blockchain network. As such, it is a problem that for an originator node to configure a blockchain transaction with an appropriate mining fee may require extensive back-and-forth communication or handshaking between the originator node and the proxy various nodes. For example, the originator node 100 may configure a blockchain transaction that includes a particular mining fee and send that blockchain transaction to a proxy node for broadcast, but then network conditions might change before the proxy node broadcasts the blockchain transaction, thus resulting in the mining fee being insufficient for likely inclusion in the next block. In such a circumstance, the proxy node might need to send a new blockchain transaction with a higher mining fee which may entail further communication such as, for example, with the originator node. This may result in undesirable messaging overhead. Further, generation of multiple blockchain transactions may undesirably consume computing resources at one or more of the originator node and the proxy nodes.

According to the present application, multiple proxy nodes may be employed to address the shortcomings of using a single proxy node and the problems associated with using multiple proxy nodes including, for example, the problem of the potential computing and messaging overhead associated with establishing the mining fee and the amount provided to the proxy node for successfully communicating a blockchain transaction for inclusion in the blockchain may be addressed. For example, the problems associated with establishing the mining fee and the amount provided to the proxy node for successfully communicating a blockchain transaction for inclusion may be addressed by allowing both to be selected by a given proxy node.

Figure 2:
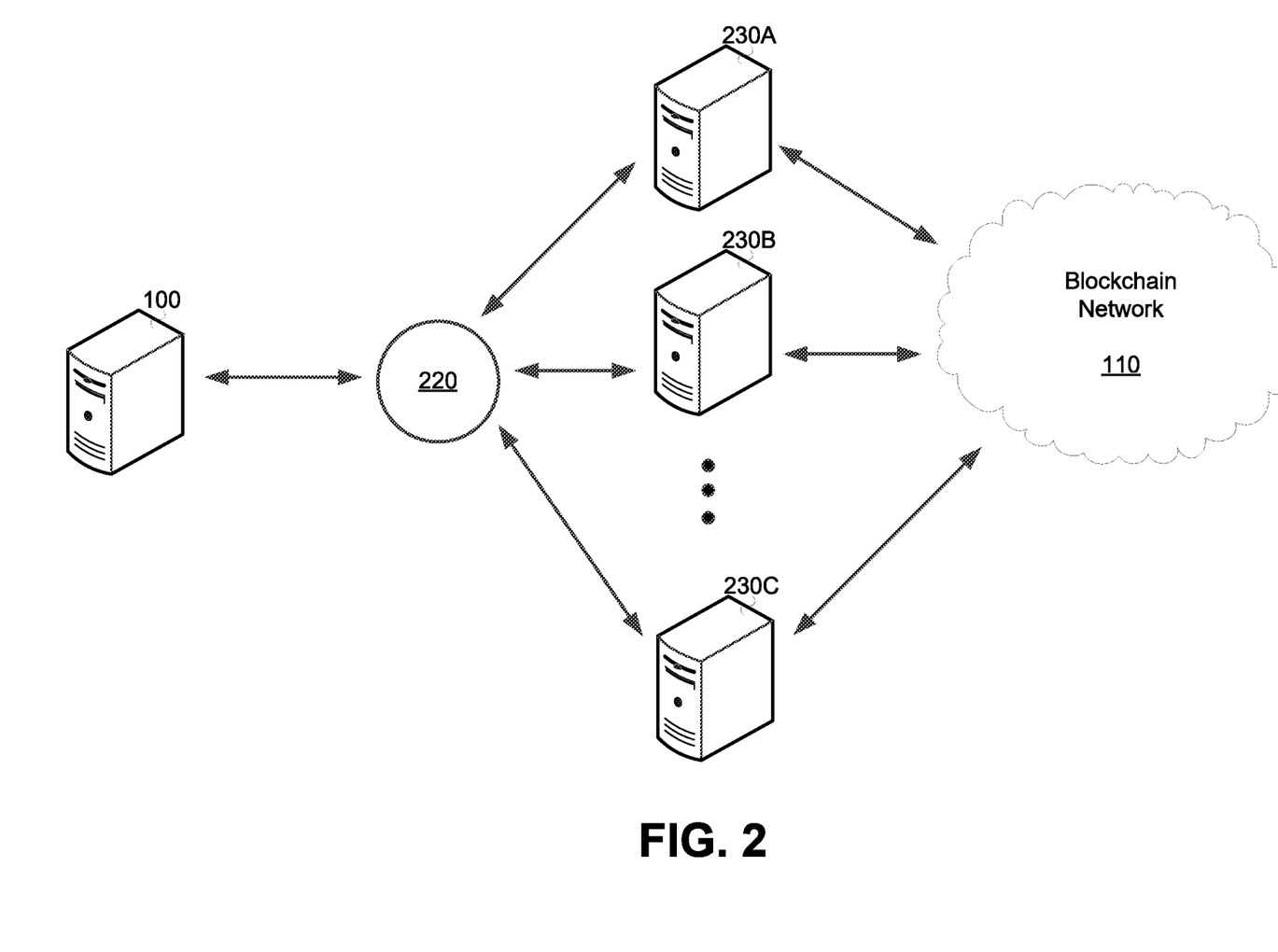
FIG. 2 illustrates the originator node of FIG. 1 communication with the blockchain network of FIG. 1 by way of a set of proxy nodes.

The high-level schematic diagram of FIG. 2 illustrates an example arrangement for how a group of proxy nodes may employed to introduce a transaction into the blockchain network 110 on behalf of the originator node 100.

As illustrated, the originator node 100 is in communication with the blockchain network 110 by way of a set of proxy nodes 230A-C via an element 220.

Each of proxy nodes 230A-C is a computing device. The proxy nodes 230A-C are in communication with the blockchain network 110. Although three proxy nodes—the proxy node 230A, the proxy node 230B, and the proxy node 230C—are shown, this is merely by way of example and the number of proxy nodes may vary.

The element 220 allows information to be communicated by the originator node 100 to one or more of the proxy nodes 230A-C and vice-versa. The element 220 may represent one or more devices such as, for example, a computer system at a well-known network address, storing information sent by one party for forwarding and/or retrieval by one or more other parties. Information stored by such an element 220 may be ephemeral and/or may expire after some defined period. In another example, the element 220 may correspond to a network connection by way of which the originator node 100 communicates with the proxy nodes 230A-C.

As further described below, the originator node 100 may communicate a blockchain transaction to the proxy nodes 230A-C for communication to the blockchain network 110. In some embodiments, one or more of the proxy nodes 230A-C may form part of the blockchain network 110. Additionally or alternatively, one or more of the proxy nodes 230A-C may communicate with one or more nodes of the blockchain network 110.

As noted above, the proxy nodes 230A-C are configured to relay blockchain transactions to the blockchain network 110 such as on behalf of the originator node 100.

As further described below, the originator node 100 may communicate a blockchain transaction to the proxy nodes 230A-C for communication to the blockchain network 110. In some embodiments, one or more of the proxy nodes 230A-C may form part of the blockchain network 110. Additionally or alternatively, one or more of the proxy nodes 230A-C may communicate with one or more nodes of the blockchain network 110.

As noted above, the proxy nodes 230A-C are configured to relay transactions to the blockchain network 110 such as on behalf of the originator node 100.

In particular, the originator node 100 may generate a partially signed blockchain transaction including surplus input value in excess of both the mining fee and the amount to be provided to the proxy node for successfully communicating a blockchain transaction for inclusion in the blockchain. As further described below, one or more of the proxy nodes 230A-C may then provide a further input to the partially signed blockchain transaction so as to define the mining fee for the blockchain transaction and may generate a further blockchain transaction to collect the amount for distributing the first blockchain transaction to the blockchain network 110.

Figure 3:
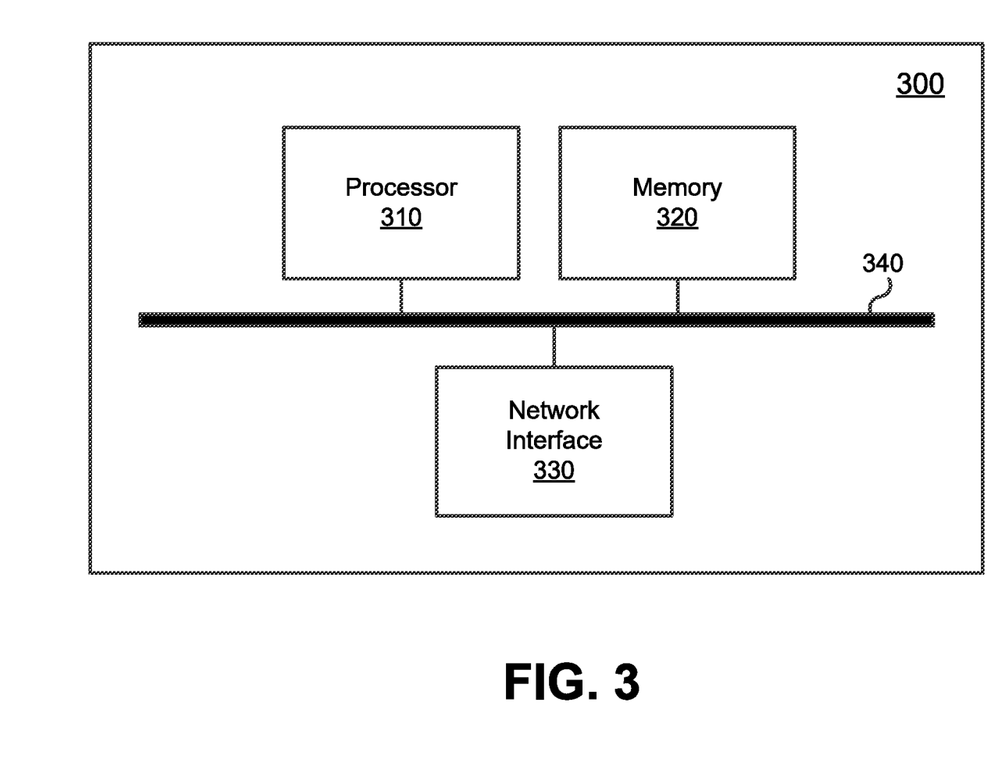
FIG. 3 illustrates an example computing device.

FIG. 3 is a high-level operation diagram of an example computing device 300. In some embodiments, example computing device 300 may be exemplary of one or more of the computer systems described herein including, for example, the originator node 100 and/or the proxy nodes 230A-C. Each of the originator node 100 and the proxy nodes 230A-C includes software that adapts it to perform a particular function.

The example computing device 300 includes a variety of modules. For example, as illustrated, the example computing device 300 may include a processor 310, a memory 320, and a network interface 330. As illustrated, the foregoing components of the example computing device 300 are in communication over a bus 340.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The network interface 330 allows the example computing device 300 to communicate with other computing devices and/or various communications networks such as, for example, the blockchain network 110 (FIGS. 1 and 2).

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

As further described below, software may adapt instances of the example computing device 300 to serve as one or more of the various computer systems mentioned herein, including, for example, the originator node 100 and the proxy nodes 230A-C.

As discussed above, the originator node 100 (FIG. 2) may provide a transaction to one or more of the proxy nodes 230A-C for distribution to the blockchain network 110. The operation of the originator node 100 in providing such a blockchain transaction to the proxy nodes is described with reference to a flowchart 400 of FIG. 4. Operations 410 and onward are performed by one or more processors of a computing device, such as for example the processor 310 (FIG. 3) of a suitably configured instance of the example computing device 300 executing software comprising computer-executable instructions as may be stored on a computer-readable storage medium such as for, example, storage of the memory 320.

Figure 4:
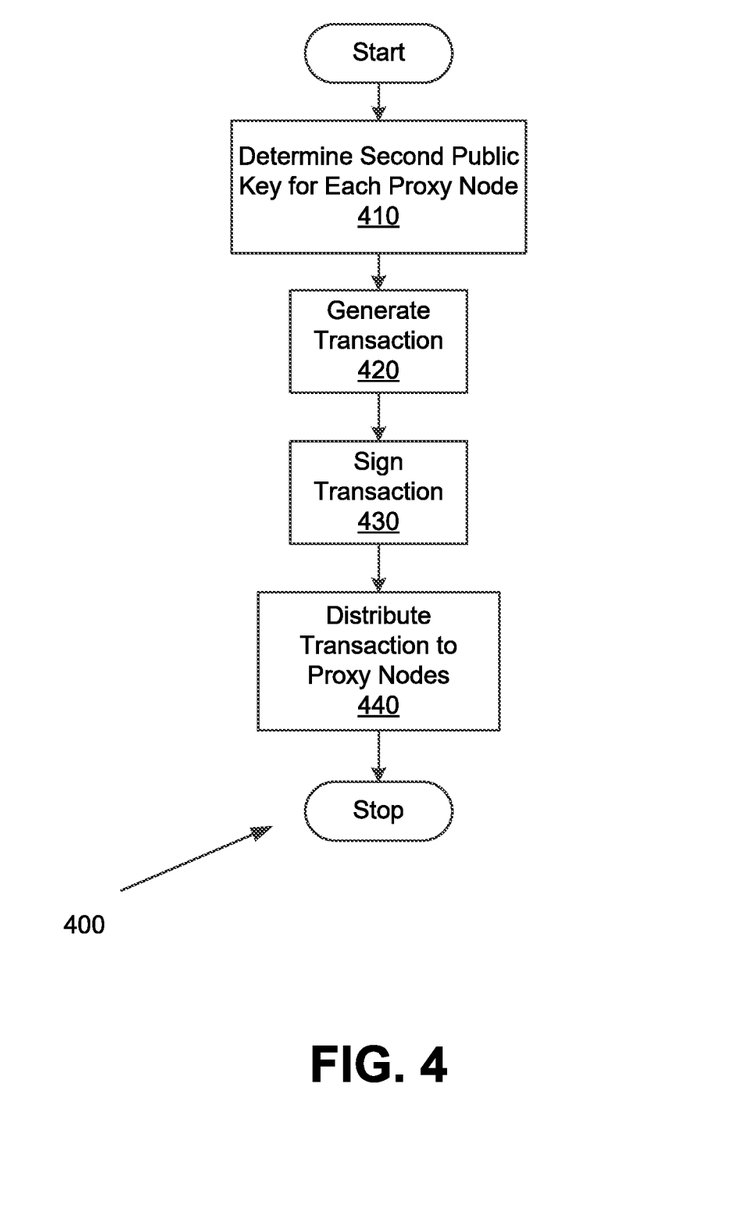
FIG. 4 is a flowchart illustrating an example method such as may be performed by the originator node of FIG. 1.

As a pre-requisite to the method illustrated in the flowchart 400, the originator node 100 exchanges public keys with each of the proxy nodes 230 A-C. The keys may, for example, be exchanged via the element 220 (FIG. 2).

For example, it may be that originator node 100 and each of the proxy nodes 230A-C generates a public-private key pair and uses the public keys in the exchange. These associated asymmetric encryption key pairs may be in addition to any other encryption keys that may be associated with a node.

As a further pre-requisite, the originator node 100 establishes a shared secret value with each of the proxy nodes 230A-C.

As further described below, it may be that the shared secret is established through the exchange of public keys. Alternatively, establishing the shared secret may involve further communication and/or computation.

At the operation 410, the originator node 100 determines a second public key for each of the proxy nodes 230A-C based on the first public key received in the pre-requisite exchange of public keys. The second public key is determined based on the first public key and the shared secret and is generated in such a fashion that a corresponding second private key for each of the proxy nodes is determinable by a given proxy node based on the secret value shared between the originator node and the given proxy node and on the private key associated corresponding to the first public key. Methods of determining a second public key based on a first public key and a shared secret that may be employed are described below.

Following determination of the second public key for each of the proxy nodes 230A-230C, control flow proceeds to an operation 420.

Figure 5:
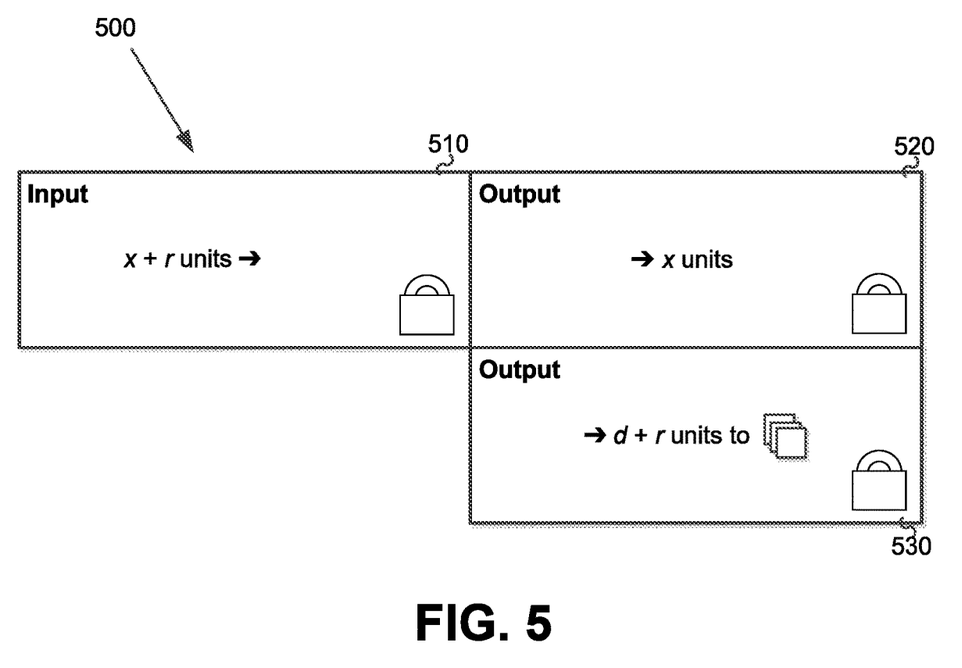
FIG. 5 illustrates a blockchain transaction such as may be generated and signed by the originator node in accordance with the example method of FIG. 4.

At the operation 420, the originator node 100 generates a blockchain transaction including one input and two outputs. An example of such a blockchain transaction is depicted in FIG. 5. As illustrated, an example blockchain transaction, a blockchain transaction 500, includes an input 510, a first output 520 and a second output 530.

The blockchain transaction 500 is intended to transfer x units of a block-chain based resource to another party via a blockchain-implemented ledger. For ease of illustration the source and destination addresses are not shown. The units may, for example, correspond to units of computing resources. The units may be units of a particular resource such as for, example, units expressed in Bitcoin.

It may be that in order to see the blockchain transaction 500 included in the blockchain, the originator node 100 is willing to offer a further r units.

As illustrated, both quantities (x+r) units are provided as input to the blockchain transaction by way of the input 510. Alternatively, it may be that these quantities are provided by way of more than one input such as, for example, if a user wishes to supply all or part of the x and r units from different addresses.

The first output 520 provides x units to an output address. The output address may be associated with the other party.

The second output 530 provides d+r units to a special address whereby amounts provided to that address can be unlocked by any one of the above-described second private keys associated with the proxy nodes 230A-C. Such a 1-of-n multi-signature address may be generated by the originator node 100 based on the above-described second public keys as were determined based on the public keys of each proxy node and the secret value that proxy node shares with the originator node 100. The particulars of such multi-signature addresses, in particular in the context of Bitcoin, can be found in "Mastering Bitcoin: Unlocking Digital Cryptocurrencies" (2014) by A. M. Antonopoulos (O'Reilly Media) (hereinafter "Mastering Bitcoin"), the contents of which are herein incorporated by reference in their entirety. Multi-signature addresses are discussed in Chapter 5 of "Mastering Bitcoin".

It may also be that additional outputs (not shown) are included in the blockchain transaction 500 such as, for example, an additional output to collect a surplus deriving from there being more than (x+r) units deriving from the source of the input 510.

Notably, the quantity d units included in the second output 530 is an arbitrary amount that results in an imbalance (shortfall) of d units in blockchain transaction 500 between the input 510 as compared to the sum of the first output 520 and the second output 530. As further described below, this makes it possible for the originator node 100 to sign the blockchain transaction 500 while being assured that the blockchain transaction 500 will not be accepted for inclusion in the blockchain without adding one or more further inputs to ensure the sum of the inputs to the blockchain transaction exceed the sum of the outputs.

Returning to FIG. 4, following the operation 420, control flow proceeds to an operation 430.

At the operation 430, the originator node 100 digitally signs the blockchain transaction 500. As noted above, the blockchain transaction 500 is incomplete because the sum of its outputs exceeds the sum of its inputs. The originator node 100 signs the blockchain transaction in such a fashion to sign all of the outputs—i.e., including the first output 520 and the second output 530—and the input 510 such that no further outputs can be added to the blockchain transaction 500 but further inputs may be added. For example, if the blockchain transaction 500 is a Bitcoin transaction, the originator node 100 may sign the blockchain transaction 500 using the flag SIGHASH_ALL | SIGHASH_ANYONECANPAY.

Following the operation 430, control flow proceeds to an operation 440.

At the operation 440, the originator node 100 distributes the blockchain transaction 500, as signed, to the proxy nodes 230A-C. In some embodiments, the originator node 100 may communicate the blockchain transaction 500 by way of the element 220. Notably, because the blockchain transaction 500 has been signed, the transaction identifier (txid) associated with the blockchain transaction is unique. As such, the originator node may communicate the txid to the proxy nodes 230A-C such as by way of, for example, the element 220. In another example, the originator node may communicate a respective indication of the txid to each of the proxy nodes 230A-C. Additionally or alternatively, the blockchain transaction 500 may be communicated in some other fashion such as, for example, by serializing it into some format for transmission to the proxy nodes 230A-C. The blockchain transaction 500 and/or the txid may be transmitted in encrypted form. For example, one or both may be distributed to each of the proxy nodes 230A-C encrypted for each proxy node using a public key of that proxy node. In a particular example, a received identifier of the blockchain transaction 500 may be encrypted using a public key of a given proxy node.

As described above, the proxy nodes 230A-C receive the blockchain transaction 500 from the originator node 100 for distribution to the blockchain network 110. The operation of an example one of the proxy nodes 230A-C in relation to distributing a blockchain transaction to the blockchain network 110 is described with reference to a flowchart 600 of FIG. 6. Operations 610 and onward are performed by one or more processors of a computing device, such as for example the processor 310 (FIG. 3) of a suitably configured instance of the example computing device 300 executing software comprising computer-executable instructions as may be stored on a computer-readable storage medium such as for, example, storage of the memory 320.

Figure 6:
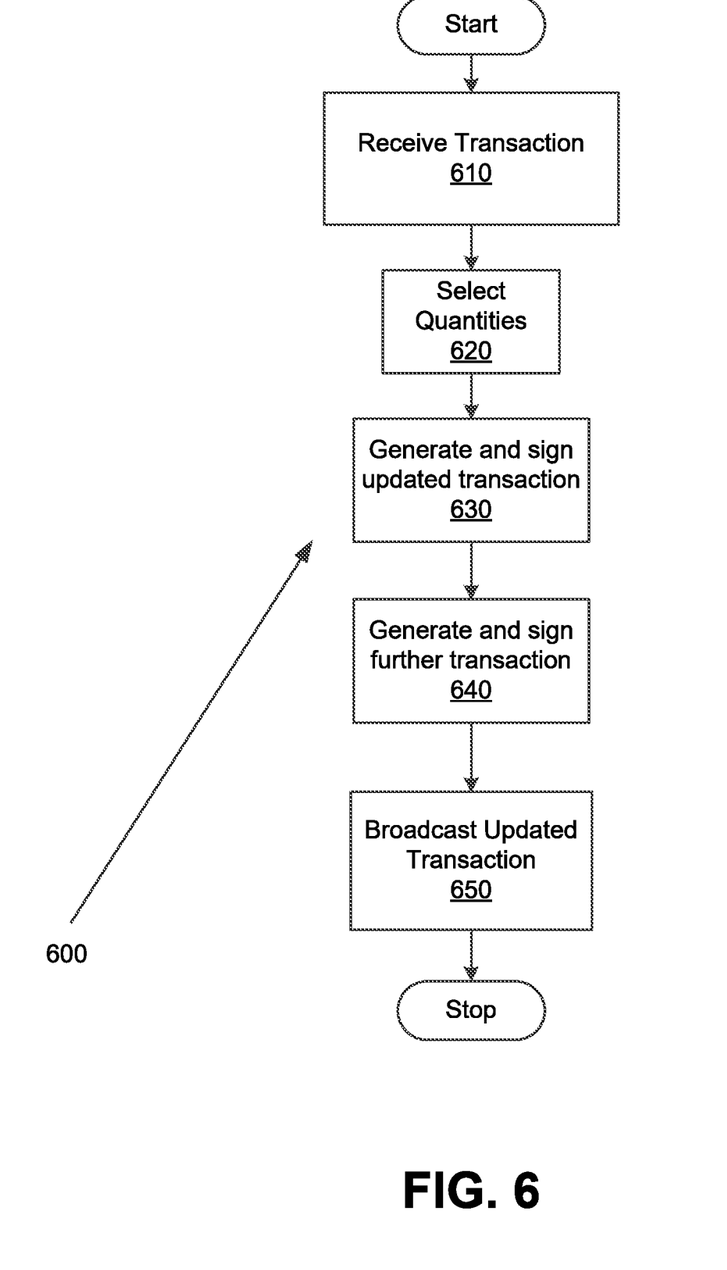
FIG. 6 is a flowchart illustrating an example method such as may be performed by one or more of the proxy nodes of FIG. 2.

The method illustrated in the flowchart 600 has pre-requisites analogous to those of the method illustrated in the flowchart 400 (FIG. 4); namely, that the proxy node has exchanged public keys with the originator node 100 (FIG. 2) such as, for example, may occur via the element 220 (FIG. 2) and that the example proxy node has established a shared secret value with the originator node 100. As such, each of the originator node 100 and the proxy node will have an associated asymmetric key pair consisting of the public key that node exchanged and the private key associated therewith.

At the operation 610, the proxy node receives the blockchain transaction 500 (FIG. 5) from the originator node. As discussed above, the blockchain transaction 500 was partially signed by the originator node 100 and includes a first input taking x+r units and a first output providing x units to an output address and a second output providing d+r units to a 1-of-n multi-signature address unlockable using any one a set of second private keys associated with the proxy nodes 230A-C. The proxy node may derive its second private key based on the private key corresponding to the public key it exchanged with the originator node 100 as a pre-requisite and on the secret value the proxy node shares with the originator node.

The blockchain transaction 500 may be received by way of receiving an identifier associated with the blockchain transaction 500. The identifier may, for example, be a transaction id (txid) of the blockchain transaction 500. Additionally or alternatively, the blockchain transaction 500 may be received in some other form such as, for example, in some serialized format and may need, for example, to be deserialized. Additionally or alternatively, the blockchain transaction 500 may be received in encrypted form. For example, the originator node 100 may have performed encryption using a public key associated with the proxy node. In a particular example, the encryption may employ the public key that the proxy node exchanged with the originator node 100 as a pre-requisite or, in another example, the second public key corresponding to the second private key of the proxy node. The proxy node may decrypt the blockchain transaction 500 or an identifier thereof using a private key corresponding to the public key associated with the proxy node.

Following the operation 610, flow control proceeds to an operation 620.

At the operation 620, the proxy node selects a number of quantities that will be used in updating the blockchain transaction 500 and in composing a further transaction to provide an amount to the proxy node if it is successful in having the blockchain transaction 500 included in the blockchain.

In particular, the proxy node selects a quantity, t units, to be allocated to the proxy node for broadcasting the blockchain transaction 500 and having the blockchain transaction 500 included in the blockchain.

Additionally, the proxy node selects a quantity, f, to be allocated to a third-party for including the blockchain transaction 500 in the blockchain. The quantity f may be denominated in units of computing resources and may, therefore, be a quantity of f units of computing resources. For example, in the case of a Bitcoin blockchain, the f units may correspond to the mining fee to be paid to a miner for including the blockchain transaction 500 in the blockchain.

It may be that the quantity f is selected based on an indication received via the computer network. For example, where the quantity f corresponds to computing resources, it may be that the quantity f of computing resources to be allocated to the third-party for including the transaction on the blockchain is selected based on an indication received via the computer network. Such an indication may be received from the originator node. Additionally or alternatively, the quantity f may be selected based on having the blockchain transaction will be included in a next block in the blockchain. For example, a webservice may be consulted to determine an amount that, if selected as the quantity f, will ensure with a desired probability or likelihood that the blockchain transaction 500 will be included in a next block in the blockchain.

Notably, the quantity f must be less than r—i.e., f<r—as otherwise the proxy node will net-receive no amount for having the blockchain transaction 500 included in the blockchain or may even be contributing its own resources (units) to having the blockchain transaction 500 included in the blockchain.

Figure 7:
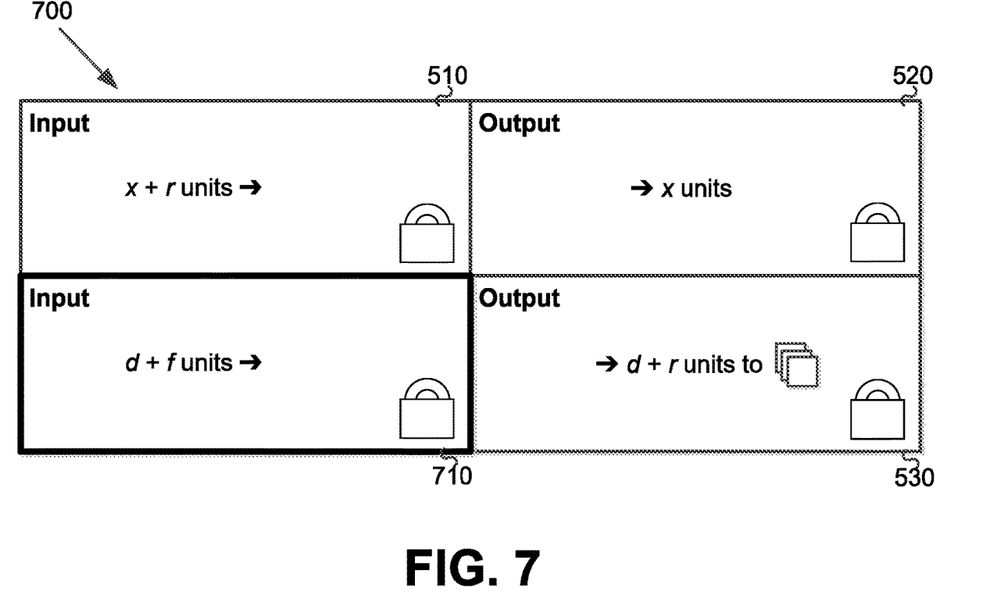
FIG. 7 illustrates an updated form of the blockchain transaction of FIG. 5.

It may be that the type of output to which the x units are sent by the first output 520 may affect the mining fee necessary for having an updated blockchain transaction 700 (further described below) included in the block chain. Accordingly, it may be that one or both of the first and second output may have a well-known form to assist proxy nodes in selecting the quantity f.

As further described below, the proxy node will generate a further transaction in order to provide it with the t units, contingent on the blockchain transaction 500 (and the further blockchain transaction) being included in the blockchain. Because an amount may also have to be provided—e.g., a mining fee to a miner in the case of Bitcoin—for including the further transaction in the blockchain, the quantity t may also be selected to allow for this amount to be paid out of the r units provided by the first input of the blockchain transaction 500. In other words, it may be that t<(r−f).

Following the selection of quantities at the operation 620, control flow proceeds to an operation 630.

At the operation 630, an updated form of the blockchain transaction 500 is generated. In particular, as described above, the blockchain transaction 500 is not suitable for inclusion in the blockchain as the sum of its outputs exceed its input. Accordingly, at the operation 630, the updated blockchain transaction 700, illustrated in FIG. 7, is generated based on the blockchain transaction 500 (FIG. 5). In particular, the updated blockchain transaction 700 is generated by adding a second input 710 taking d+f units to the blockchain transaction 500. Notably, the d units serve to balance the d units in the second output 530. The f units are to provide for including the updated blockchain transaction 700 in the blockchain as described above—e.g., a mining fee in the case of Bitcoin.

The proxy node also signs the updated blockchain transaction 700 to sign the second input 710. For example, in the case where the updated blockchain transaction 700 is a bitcoin transaction, the proxy node may sign the updated blockchain transaction 700 with the flag SIGHASH_ALL-|SIGHASH_ANYONECANPAY. This further cryptographic signature will have the side effect that the updated blockchain transaction 700 has a different transaction id (txid) from the blockchain transaction 500.

As a result of having inputs totaling at least the total all of the outputs and in view of all of those inputs and outputs being signed, the update blockchain transaction 700 is in a form suitable for inclusion in the blockchain.

Returning to FIG. 6, following the operation 630, control flow proceeds to an operation 640.

At the operation 640, as mentioned above, a further blockchain transaction 800 is generated and digitally signed. In particular, the proxy node generates and digitally signs a further blockchain transaction 800, illustrated in FIG. 8. The further blockchain transaction 800 includes an input 810 taking d+r units sourced from the 1-of-n multi-signature address of the second output 530 of the blockchain transaction 700 (FIG. 7) and unlocked using the second private key of the proxy node derived based on the private key corresponding to the public key of the proxy node exchanged with the originator node 100 in the pre-requisites and the secret value that the proxy node shares with the originator node 100. The further blockchain transaction 800 also includes an output 820 providing t units to an address such as may be selected by the proxy node. In effect, the t units will be an amount to the proxy node only if the updated blockchain transaction 700 (and the further blockchain transaction 800) is (are) included in the blockchain. Notably, the difference between t and d+r—i.e., t−d−r—may be an amount for including the blockchain transaction 800 in the blockchain (e.g., the mining fee to a miner in the case where the blockchain network 110 is the Bitcoin network). As such, one or both of the quantity f and the quantity t may be selected so that an amount of t−d−r will allow the further blockchain transaction 800 to be included in a next block in the blockchain.

Returning to FIG. 6, following the operation 640, control flow proceeds to an operation 650.

Figure 8:
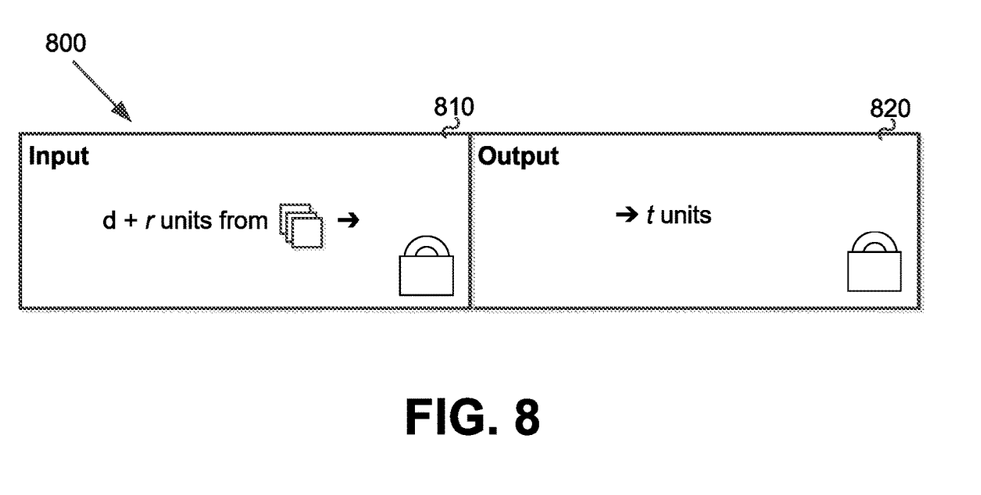
FIG. 8 illustrates a further blockchain transaction such as may be generated by a proxy node in in accordance with the example method of FIG. 6.

At the operation 650, both the blockchain transaction 700 and the blockchain transaction 800 are broadcast to the blockchain network 110 by the proxy node. The broadcast of the updated blockchain transaction 700 and the further blockchain transaction 800 may be timed to permit their inclusion in the same block of the blockchain. For example, it may be that the updated blockchain transaction 700 and the further blockchain transaction 800 are broadcast simultaneously/in close succession. Conveniently, where the quantities f and t−d−r are such that the updated blockchain transaction 700 and the further blockchain transaction 800 will be included in the next block in the block chain and their broadcasts are so timed, then both transactions may be included in the same, next block of the blockchain.

As discussed above, the originator node 100 may send the blockchain transaction 500 to each of the proxy nodes 230A-C. Accordingly, each of the proxy nodes 230A-C may generate its own version of the updated blockchain transaction 700 and the blockchain transaction 800. Notably, each instance of the updated blockchain transaction 700 will have a different txid because of the different forms of the second input 710. Further notably however, each of these versions of the updated blockchain transaction 700 will take have a first input, the input 510, identical to the input 510 of the blockchain transaction 500 and thus will draw unspent-transaction output from, the same source as the input 510. Accordingly, each of these versions of the updated blockchain transaction 700 will appear to the blockchain network 110 as a double spending attack (i.e., a transfer of the same fractions of a particular token to different parties) vis-a-vis any other version of the updated blockchain transaction 700. Conveniently, however, because most blockchain-based ledgers such as, for example Bitcoin, prevent double-spending, only one instance of the updated blockchain transaction 700 will be included in the blockchain.

Different instances of the blockchain network 110 may resolve the double-spending in favour of a particular one of the various versions of the updated blockchain transaction 700 in different ways. It may, for example, be that a node constructing a blockchain block (e.g., a miner) may select the first block it sees. In the case of Bitcoin, while multiple versions of the updated blockchain transaction 700 may be temporarily stored in memory (in the so-called "mempool") in a mining node, the miner will have selected the updated blockchain transaction 700 having the highest mining fee to the miner for inclusion the next block. Notably, because of the relationship between the quantities r, f, and t this also has the side-effect of selecting the version of the updated blockchain transaction 700 originating at the proxy node selecting the lowest value of t. More detail on the mempool can be found in Chapter 8 of "Mastering Bitcoin" (see above for citation).

Notably, once the updated blockchain transaction 700 is included in the blockchain, the transaction id of the updated blockchain transaction 700 is publicly available. This means that any one of the proxy nodes 230A-C (even if not the proxy node that sent the version of the updated blockchain transaction 700 that was included in the blockchain) may spend the output of the transaction output. This concern may, however, be mitigated by generating the further blockchain transaction 800 prior to distributing the updated blockchain transaction 700, by broadcasting both the updated blockchain transaction 700 and the further blockchain transaction 800 simultaneously, and by providing amounts (e.g., mining fees), as needed, to ensure both the updated blockchain transaction 700 and the further blockchain transaction 800 are included in the same (next) block.

More than One Originator Node

The above description includes only a single originator node—the originator node 100—however it may be that multiple originator nodes are in communication with each of the proxy nodes 230A-C. Conveniently, it may be that the proxy nodes 230A-C can exchange the public key of the same keypair with each of such multiple originator nodes.

Establishing the Pre-Requisites

As noted above, both of the methods illustrated in the flowchart 400 (FIG. 4) and the flowchart 600 (FIG. 6) require that the originator node 100 has exchanged public keys with each of the proxy nodes 230A-C and that the originator node 100 shares a respective secret value with each one of the proxy nodes 230 A-C.

The originator node 100 and each of the proxy nodes 230A-C may generate a random elliptical-curve public-private key pair. The public keys of the elliptical-curve key pairs may be exchanged.

In particular, the originator node 100 may choose a random private key $x_A$ and may publish the corresponding public key $P_A = x_A \times G$.

Similarly, each of the proxy nodes 230A-C may choose a random private key $y_{B,i}$ and may publish the corresponding public key $Q_{B,i} = y_{B,i} \times G$.

Using this information, the originator node 100 may determine a shared secret value, $c_i$ with each of the proxy nodes 230A-C, where $c_i = H(x_A \times Q_{B,i})$, where H is a cryptographic hash function such as, for example, a member of the SHA-2 family. Similarly, each of the proxy nodes 230A-C may likewise determine the secret value it shared with the originator node 100 being as $c_i = H(P_A \times y_{B,i}) = H(x_A \times Q_{B,i})$ with the equality being because of the homomorphic property of elliptical curves. Notably, the above-described steps of establishing the secret value shared between the originator node and a particular proxy node corresponds to an Elliptical-Curve Diffie-Hellman (ECDH) key exchange.

The originator node 100 may also determine a further public key for each of the proxy nodes 230A-C based on the secret value shared with a given proxy node and the published public key of that. In particular, such a further public key (corresponding to the second public key described above) may be computed as $Q'_{B,i} = Q_{B,i} + c_i \times G$. Conveniently, although the second public keys are generated by the originator node 100, the corresponding private key, $S_{B,i}$ (corresponding to the above-discussed "second private key") will be determinable only by the corresponding proxy node. In particular, a proxy node may determine its second private key based on its private key $y_{B,i}$ and on the secret value that proxy node shares with the originator node 100 where, in particular, $S_{B,i} = (y_{B,i} + c_i)$.

Alternatives for establishing the pre-requisites may also be employed. For example, classic Diffie-Hellman Key Exchange (based on the discrete logarithm problem) could be performed by the originator node 100 with each of the proxy nodes 230A-C in order to establish a respective shared value with each proxy node. Public keys may also be exchanged in some other fashion. For example, public keys could be exchanged directly or, alternatively, could be exchanged over a secure channel, such as for example, over a secure channel as may, for example, be established further to the above-described classic Diffie-Hellman Key Exchange.

It should be noted that the above-mentioned embodiments illustrate rather than limit the subject matter of the present application, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The subject matter of the present application may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising, by a given proxy node:
    determining a second private key associated with the given proxy node, based on a private key of an asymmetric encryption key pair of the given proxy node and a secret value the given proxy node shares with an originator node;
    receiving, via a computer network, an encrypted transaction generated and partially signed by an originator node;
    decrypting the transaction to produce a blockchain transaction, the blockchain transaction including a first input and a first and second output, wherein the first input takes a first quantity of computing resources comprising x+r units and wherein the first output allocates a portion of the first quantity of the computer resources comprising x units to an output address and the second output provides a second quantity of the computing resources comprising d+r units to a 1-of-n multi-signature address unlockable using any one of a plurality of second private keys, each of the second private keys being associated with a respective one of a plurality of proxy nodes, the plurality of proxy nodes including the given proxy node, and each of the second private keys derivable by the respective one of the plurality of proxy nodes based on a private key of an asymmetric encryption key pair of that proxy node and a secret value that proxy node shares with the originator node;

selecting a quantity of computing resources, t units to be allocated to the given proxy node for broadcasting the blockchain transaction and having the blockchain transaction included in the blockchain and selecting a fourth quantity of computing resources comprising f units to be allocated to a third-party for including the blockchain transaction in the blockchain, wherein the quantities of computing resource units are such that f<r and t<(r−f);

digitally signing an updated transaction generated by adding a second input taking a portion of the second and fourth quantities of computing resources comprising d+f units to the blockchain transaction;

generating and digitally signing a further transaction including an input taking the second quantity of computing resources comprising d+r units sourced from the 1-of-n multi-signature address using the second private key of the proxy node and an output providing the third quantity of computing resources comprising t units to the given proxy node; and broadcasting the updated transaction and the further transaction, timed to permit their inclusion in the same block of the blockchain.

2. The method according to claim 1, wherein receiving the transaction includes receiving an identifier of the transaction.

3. The method according to claim 1, wherein the broadcast of the updated transaction and the broadcast of the further transaction are substantially concurrent.

4. The method according to claim 1, wherein the fourth quantity of computing resources comprising f units to be allocated to the third-party for including the transaction in the blockchain is selected based on an indication received via the computer network.

5. The method of claim 4, wherein the indication is received from the originator node.

6. The method according to claim 1, wherein the fourth quantity of computing resources, f units to be allocated to the third-party for including the transaction in the blockchain is selected based on having the transaction included in a next block in the blockchain.

7. The method according to claim 1, wherein at least the fourth quantity of computing resources comprising f units to be allocated to the third-party for including the transaction in the blockchain and the quantity of computing resources comprising t units to be allocated to the given proxy node for broadcasting the transaction is further selected based on having the further transaction included in a next block in the blockchain.

8. The method according to claim 1, wherein the originator node has an associated asymmetric encryption key pair including a public key and a private key and wherein the secret value shared between the originator node and the given proxy node is derivable by the originator node based on its private key and the public key of the given proxy node and by the given proxy node based its private key and the public key of the originator node.

9. The method according to claim 1, wherein the asymmetric encryption key pairs are elliptical-curve key pairs and wherein establishing the secret value shared between the originator node and a particular proxy node corresponds to an Elliptical-Curve Diffie-Hellman (ECDH) key exchange.

10. A computing device comprising:
a processor;
a memory;
a network interface; and
a non-transitory computer-readable storage medium storing computer-executable instructions that, when executed by the processor, cause the computing device to:
determine a second private key associated with the given proxy node, based on a private key of an asymmetric encryption key pair of the given proxy node and a secret value the given proxy node shares with an originator node;
receive, via a computer network, an encrypted transaction generated and partially signed by an originator node;
decrypt the transaction to produce a blockchain transaction, the blockchain transaction including a first input and a first and second output, wherein the first input takes a first quantity of computing resources comprising x+r units and wherein the first output allocates a portion of the first quantity of the computing resources comprising x units to an output address and the second output provides a second quantity of the computing resources comprising d+r units to a 1-of-n multi-signature address unlockable using any one of a plurality of second private keys, each of the second private keys being associated with a respective one of a plurality of proxy nodes, the plurality of proxy nodes including the given proxy node, and each of the second private keys derivable by the respective one of the plurality of proxy nodes based on a private key of an asymmetric encryption key pair of that proxy node and a secret value that proxy node shares with the originator node;
selectable a third quantity of computing resources comprising t units to be allocated to the given proxy node for broadcasting the blockchain transaction and having the blockchain transaction included in the blockchain and selecting a fourth quantity of computing resources comprising f units to be allocated to a third-party for including the blockchain transaction in the blockchain, wherein the quantities of computing resource units are such that f<r and t<(r−f);
digitally sign an updated transaction generated by adding a second input taking a portion of the second and fourth quantities of computing resources comprising d+f units to the blockchain transaction;
generate and digitally sign a further transaction including an input taking the second quantity of computing resources comprising d+r units sourced from the 1-of-n multi-signature address using the second private key of the proxy node and an output providing the third quantity of computing resources comprising t units to the given proxy node; and
broadcast the updated transaction and the further transaction, timed to permit their inclusion in the same block of the blockchain.

11. A non-transitory computer-readable storage medium storing computer-executable instructions that, when executed by a processor of a computing device, cause the computing device to:
determine a second private key associated with the given proxy node, based on a private key of an asymmetric encryption key pair of the given proxy node and a secret value the given proxy node shares with an originator node;
receive, via a computer network, an encrypted transaction generated and partially signed by an originator node;

decrypt the transaction to produce a blockchain transaction, the blockchain transaction including a first input and a first and second output, wherein the first input takes a first quantity of computing resources comprising x+r units and wherein the first output allocates a portion of the first quantity of the computing resources comprising x units to an output address and the second output provides a second quantity of the computing resources comprising d+r units to a 1-of-n multi-signature address unlockable using any one of a plurality of second private keys, each of the second private keys being associated with a respective one of a plurality of proxy nodes, the plurality of proxy nodes including the given proxy node, and each of the second private keys derivable by the respective one of the plurality of proxy nodes based on a private key of an asymmetric encryption key pair of that proxy node and a secret value that proxy node shares with the originator node;

select a third quantity of computing resources comprising t units to be allocated to the given proxy node for broadcasting the blockchain transaction and having the blockchain transaction included in the blockchain and selecting a fourth quantity of computing resources comprising f units to be allocated to a third-party for including the blockchain transaction in the blockchain, wherein the quantities of computing resource units are such that $f<r$ and $t<(r-f)$;

digitally sign an updated transaction generated by adding a second input taking a portion of the second and fourth quantities of computing resources comprising d+f units to the blockchain transaction;

generate and digitally sign a further transaction including an input taking the second quantity of computing resources comprising d+r units sourced from the 1-of-n multi-signature address using the second private key of the proxy node and an output providing the third quantity of computing resources comprising t units to the given proxy node; and broadcast the updated transaction and the further transaction, times to permit their inclusion in the same block of the blockchain.

12. The non-transitory computer-readable storage medium of claim 11, wherein the computer-executable instructions that cause the computing device to receive the transaction further cause the computing device to receive an identifier of the transaction.

* * * * *